US010281948B2

(12) United States Patent
Jacuzzi

(10) Patent No.: US 10,281,948 B2
(45) Date of Patent: May 7, 2019

(54) MULTI-OPERATIONAL MUSIC HARDWARE CONTROLLER

(71) Applicant: Giordano P. Jacuzzi, Orinda, CA (US)

(72) Inventor: Giordano P. Jacuzzi, Orinda, CA (US)

( * ) Notice: Subject to any disclaimer, the term of this patent is extended or adjusted under 35 U.S.C. 154(b) by 176 days.

(21) Appl. No.: 15/194,534

(22) Filed: Jun. 27, 2016

(65) Prior Publication Data

US 2016/0378428 A1 Dec. 29, 2016

Related U.S. Application Data

(60) Provisional application No. 62/184,735, filed on Jun. 25, 2015.

(51) Int. Cl.
*G06F 17/00* (2006.01)
*G05G 9/02* (2006.01)

(52) U.S. Cl.
CPC .................................... *G05G 9/02* (2013.01)

(58) Field of Classification Search
CPC ........................................ G05G 9/02
USPC ........................................ 700/94
See application file for complete search history.

(56) References Cited

U.S. PATENT DOCUMENTS 6,438,241 B1 * 8/2002 Silfvast .................. H04H 60/04 307/112
7,227,963 B1 * 6/2007 Yamada ............... G10H 1/0091 369/4
7,309,829 B1 * 12/2007 Ludwig .................... G10H 1/00 84/609
8,300,853 B2 * 10/2012 Aiso .................. H05B 33/0863 315/279
8,697,973 B2 * 4/2014 Souppa ............... G06F 3/04847 84/477 R
9,824,672 B2 * 11/2017 Ludwig .................... G10H 1/32
9,952,573 B2 * 4/2018 Sloo ........................ G05B 15/02
2010/0266147 A1 * 10/2010 Radford ................. H04H 60/04 381/119
2013/0091437 A1 * 4/2013 Ludwig .............. G06K 9/00355 715/751
2013/0239787 A1 * 9/2013 McMillen ................ G10H 1/02 84/643

OTHER PUBLICATIONS

SSL J series console manual; Copyright 1994.*
Force sensing pushbutton rotary encoder with Rgb functionality available for sale at least Apr. 1, 2015.*
Fretless Fader interview (Year: 2011).*

* cited by examiner

*Primary Examiner* — Paul C McCord
(74) *Attorney, Agent, or Firm* — Polsinelli LLP

(57) ABSTRACT

Disclosed is a hardware controller that may interact with audio, lighting, or other computer componentry to control various digital parameters of the same. The presently disclosed controller allows for button presses, knob twisting, and slider engagement, but does so in a manner that remains intuitive without the need for partitioning a mixer into separate sections for independent devices. In this manner, the present invention avoids the need for a large physical footprint that would otherwise require a large amount of space and the use of multiple hands over a period of time by the user.

19 Claims, 5 Drawing Sheets

Schematic

Electronic schematic for a combination rotary encoding and force sensing slide potentiometer switch device with visual RGB LED feedback.

SCHEMATIC KEY:

1. Slide Potentiometer (Output)
2. Force Sensing Resistor (Output)
3. Switch (Output)

4a. Encoder Terminal A (Output)
4b. Encoder Terminal B (Output)
5a. Red LED (Input)
5b. Green LED (Input)
5c. Blue LED (Input)

MULTI-OPERATIONAL MUSIC HARDWARE CONTROLLER

CROSS-REFERENCE TO RELATED APPLICATIONS

The present application claims the priority benefit of U.S. provisional application No. 62/184,735 filed Jun. 25, 2015, the disclosure of which is incorporated herein by reference.

BACKGROUND OF THE INVENTION

Field of the Invention

The present invention generally relates to signal management. More specifically, the invention relates to music mixing consoles and hardware controllers that route and change volume, timbre, and dynamics of audio signals that might be generated by the likes of microphones for performing artists, acoustical microphones for various instruments, and signals generated by electric or electronic instruments, as well as recorded music or samples that may be generated by other musical hardware componentry.

Description of the Related Art

A controller or mixing console combines or mixes audio signals from various input sources. A mixer or controller may be capable of manipulating analog and/or digital signals. Modified signals or samples are summed to produce combined output signal that are then broadcast, amplified through a sound reinforcement system, recorded, or a combination of the foregoing.

Such controllers have numerous applications and may be found in recording studios, nightclubs, and broadcast television studios. Such controllers may be used for tasks as mundane as servicing public address announcements to complex engagements such as film post-production. The specific design—and corresponding cost and complexity—of any given controller or mixer may depend on the particular venue in which the controller or mixer is used and the corresponding tasks to be managed by said controller or mixer.

For example, in a live performance environment, the signal from a mixer may be directed to an amplifier that is, in turn, plugged directly into a speaker cabinet. A DJ mixer, on the other hand, may have two channels that might be used for mixing two record players or other input device. A coffeehouse or other small venue may have a six-channel mixer for mixing singer-guitarists and a percussionist whereas a nightclub may have 24-channels for mixing the likes of a rhythm section, lead guitar, and various vocalists. A concert venue may have a 48-channel mixer whereas a professional recording studio may have 72-channel equipment.

In the above-referenced examples, the mixer-amplifier-speaker configuration of a mixer or controller in a live-performance venue could not satisfy the demands of a concert venue or professional recording studio that require tens of if not hundreds of channel inputs. And while the equipment used in a professional recording studio or concert venue could readily satisfy the demand of the live-performance, the costs of such a high-end mixer might far surpass the economic capabilities of the smaller, live-performance venue.

Similar issues exist with respect to the technical complexity of analog versus digital mixer or controller consoles. For example, analog consoles remain popular in the present-day performance and studio market place as they have columns of dedicated, physical knobs, buttons, and faders for each channel. These configurations are not only logical but familiar to those of ordinary skill in the music and sound management industries. The logic and familiarity of these configurations demand increasing amounts of physical space subject to the number of channels demanded by a venue or performance, but can nevertheless accommodate rapid responses to changing performance conditions (e.g., on-the-fly addition or changing of channel configurations).

Digital mixers and controllers, however, significantly reduce physical space requirements by compromising the logical and convenient layout of the user interface. For example, the interface of a digital soundboard may service any number of channels—but only one such channel at a time. Additionally, most digital mixers have virtual pages or layers that change fader banks into separate controls for additional inputs or for adjusting equalization or auxiliary send levels. This layering—while convenient in terms of physical footprint—can be confusing to "old school" soundboard or mixer operators. Digital mixers do, however, allow for extremely easy building of a mix from saved data, which cannot be achieved in the analog context.

There is a need in the art for a mixer or controller solution that is modular such that it can address the demands of a particular performance or mixing environment without incurring significant economic build-out costs. Such a solution should likewise combine the smaller footprint benefits of a digital mixer environment while simultaneously maintaining the familiarity and logic of an analog mixer solution.

SUMMARY OF THE PRESENT CLAIMED INVENTION

A first claimed embodiment of the present invention is for a multi-operational controller having combination rotary encoding and force sensing slide potentiometer switching with visual RGB LED feedback.

The multi-operational controller may be modular and include, by example, four controllers. The LEDs of such a controller may be implemented in an RGB configuration.

DETAILED DESCRIPTION

The present invention relates to a digitally-based apparatus for indicating the position of certain adjustable members, such as a fader control lever or rotary encoder. The present invention further indicates the instantaneous state of other adjustable members requiring active user interaction such as a switch or pressure sensor, which may be used in an apparatus to control multiple parameters of an audio or other signal simultaneously. Embodiments of the present invention combine the functionality of common interactors to reduce space and increase efficiency by allowing, for example, potentiometers to double as buttons and buttons to double as pressure sensors while concurrently providing direct visual feedback to the user without the need to carefully monitor use on a computer screen or other dedicated visual monitor.

The present invention allows users to simultaneously perform a multitude of different tasks with one hand through different organic motions—such as twisting, pushing, and pulling—by manipulating different electronic parameters of the invention. As a result, there is a reduced need for physical space as currently available mixer hardware allocates each of these parameters to its own individual space: one section for buttons, another for potentiometers, and so on.

The present invention likewise increases user efficiency. For example, current hardware requires a user to use two separate hands to simultaneously adjust a linear potentiometer and a rotary encoder. The present invention allows a user to simultaneously control both while also leveraging the additional nuances of control provided by the switch and force sensitive resisting technology.

The present invention also allows for a modular design. Instead of being limited to a pre-existing configuration as is found in presently available mixers and controllers, a series of slide potentiometers—as described below—may be added on a "building block" fashion to a sound board that might be expanded or reduced subject to the demands of a particular recording task or sound venue. In this manner, a user may enjoy the flexibility of a digital console without losing the logical and intuitive layout of an analog console. By combing push button, rotary encoding, and slide functionality into a singular and compact mechanism, said mechanism may be added or removed at will from an equally modular board environment.

Figure 1:
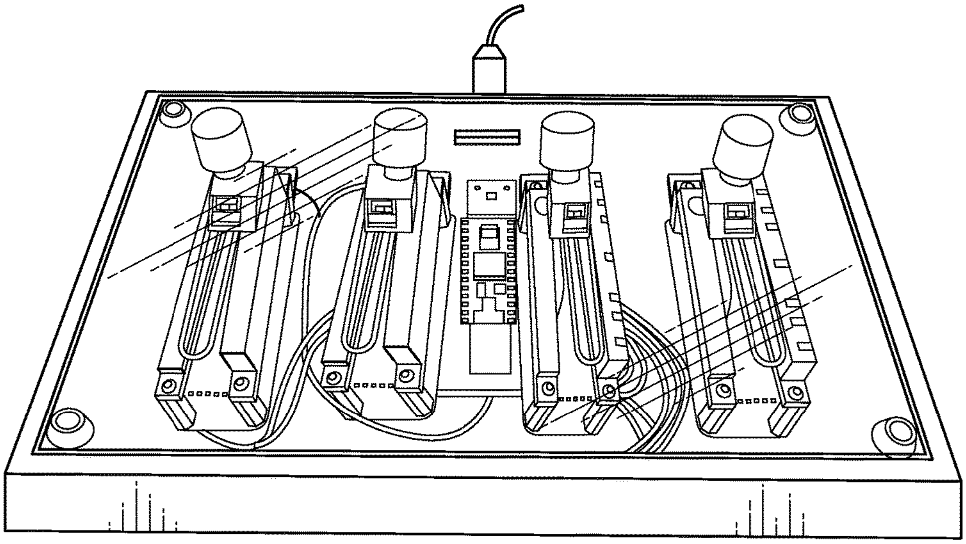
FIG. 1 illustrates a series of four multi-operational controllers with an LED.
Figure 2:
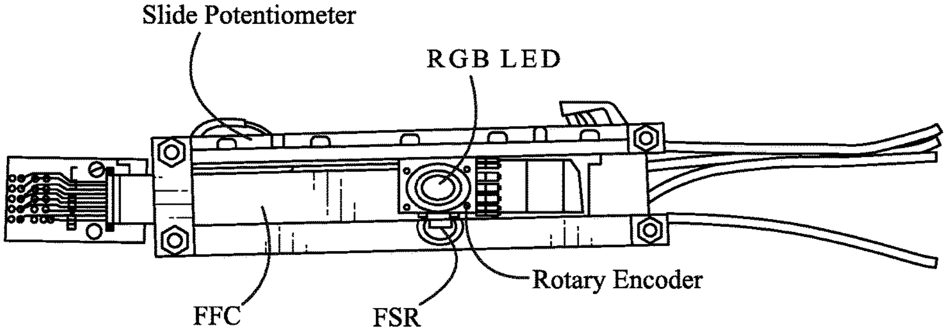
FIG. 2 illustrates a singular instance of the presently disclosed multi-operational controller.

In this regard, FIG. 1 illustrates a series of four multi-operational controllers with an LED. FIG. 2 illustrates a singular instance of the presently disclosed multi-operational controller, which may be implemented in a modular context like that shown in FIG. 1. FIG. 2 further illustrates the slide potentiometer, RGB LED, rotary encoder, FSR, and FFC as are further described herein.

Figure 3:
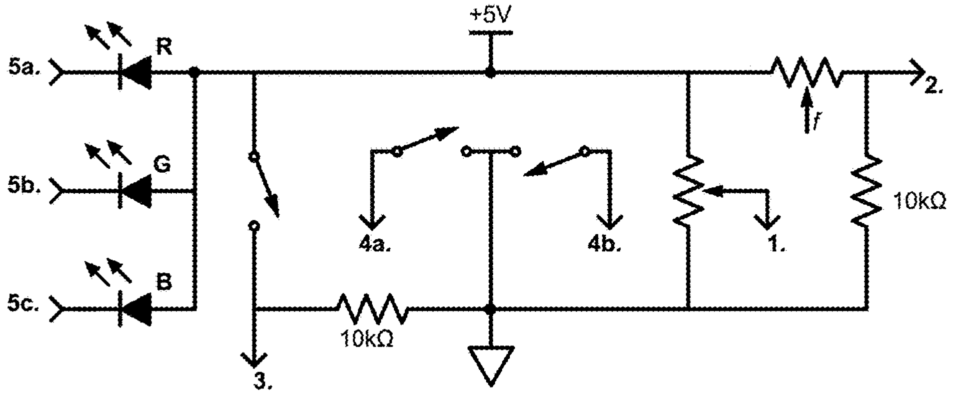
FIG. 3 illustrates a schematic for a multi-operational controller having combination rotary encoding and force sensing slide potentiometer switching with visual RGB LED feedback.

FIG. 3 illustrates a schematic for a multi-operational controller having combination rotary encoding and force sensing slide potentiometer switching with visual RGB LED feedback. The schematic of FIG. 3 illustrates inter alia a slide potentiometer, force sensing resistor, and switch (all outputs) as well as an ecoder Terminal A and B (also outputs). Red, green, and blue (RGB) light emitting diodes (LEDs) are illustrated as inputs.

Figure 4:
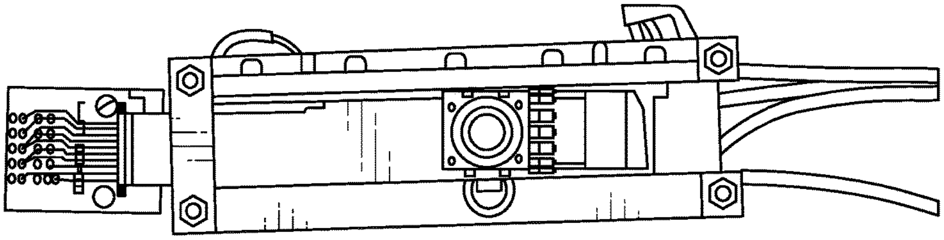
FIG. 4 illustrates a top view of the presently disclosed multi-operational controller.
Figure 5:
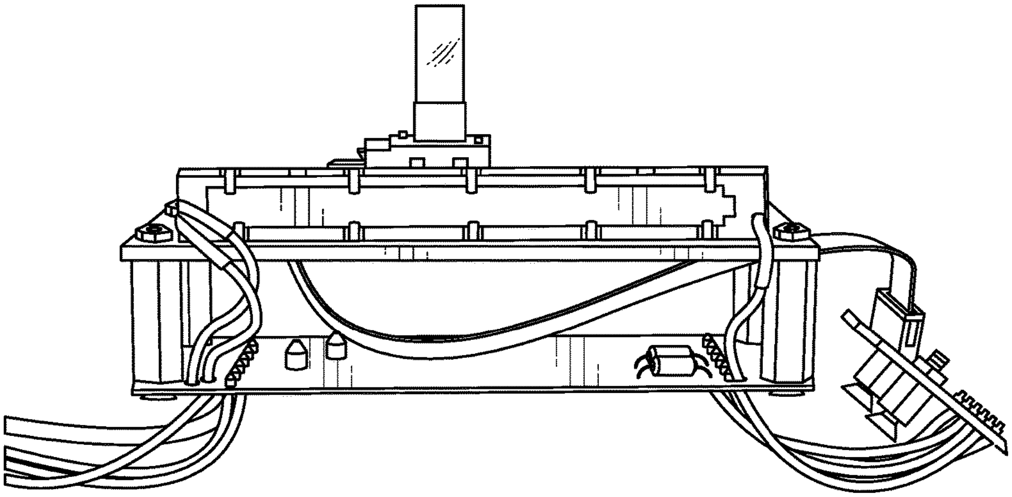
FIG. 5 illustrates a right view of the presently disclosed multi-operational controller.
Figure 6:
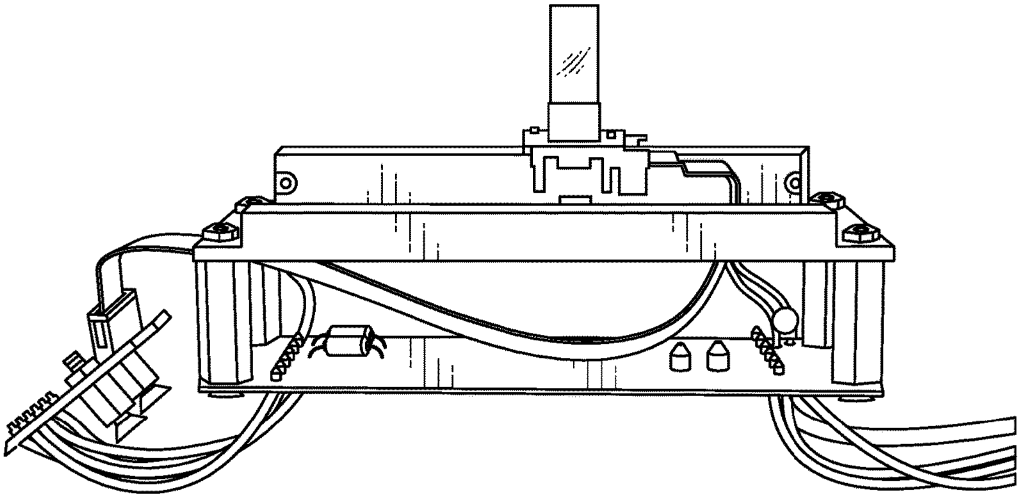
FIG. 6 illustrates a left view of the presently disclosed multi-operational controller.
Figure 7:
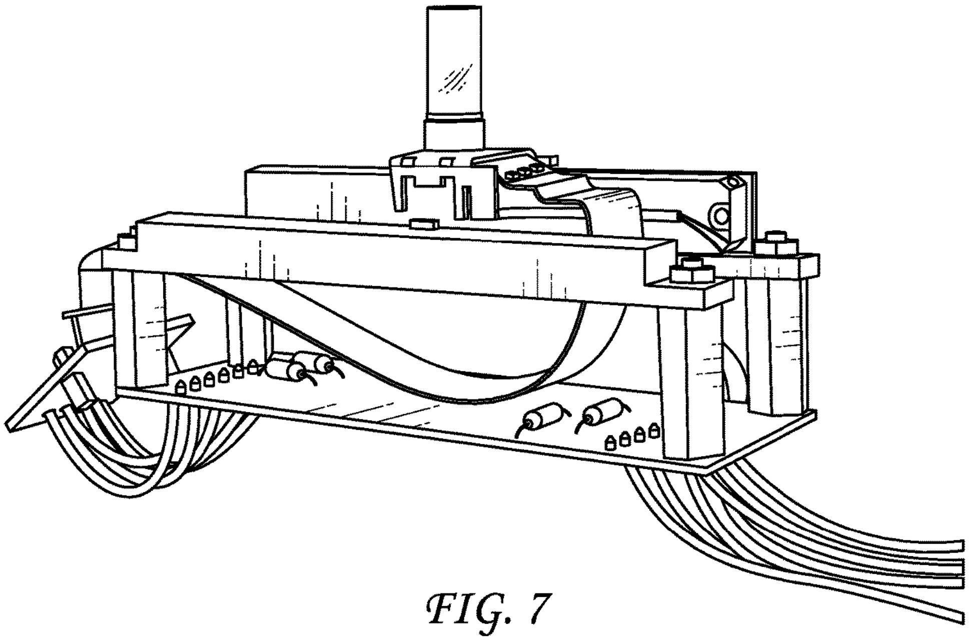
FIG. 7 illustrates a front view of the presently disclosed multi-operational controller.
Figure 8:
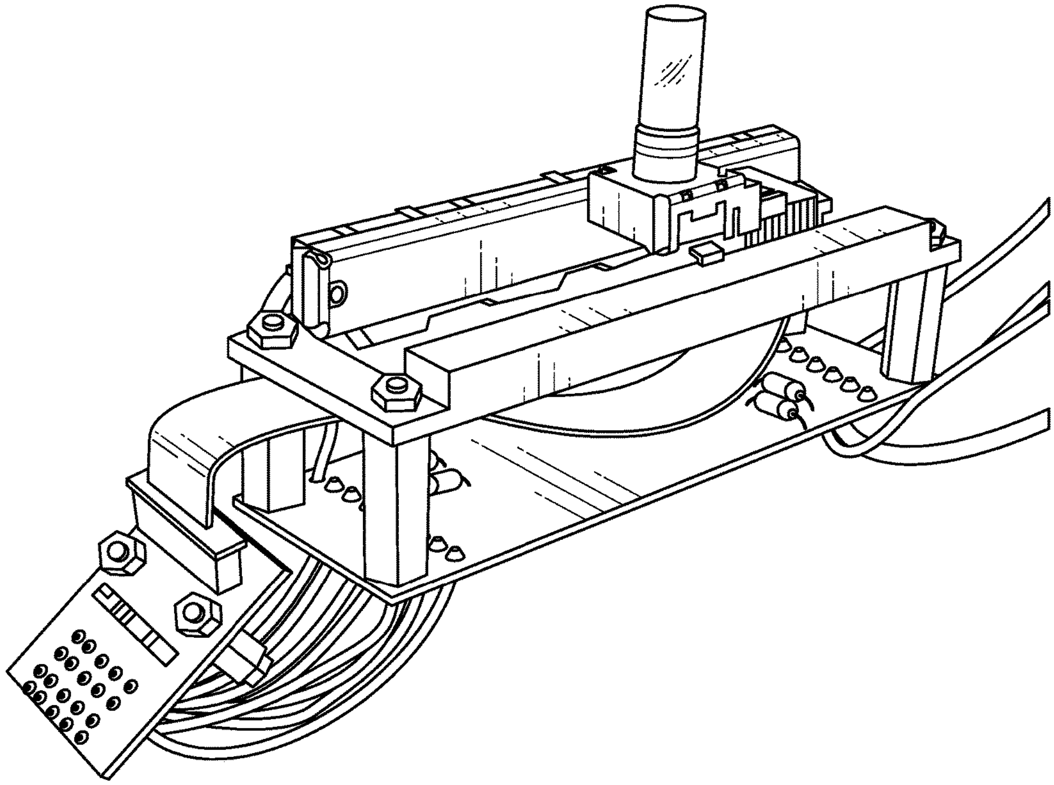
FIG. 8 illustrates a back view of the presently disclosed multi-operational controller.

FIG. 4 illustrates a top view of the presently disclosed multi-operational controller while FIGS. 5, 6, 7, and 8 illustrates a right, left, front, and back view respectively.

Embodiments of the present invention—as noted above—also provide visual feedback to the user with an embedded RGB light emitting diode (LED). The present invention may be constructed such that a rotary encoder and switch have an RGB LED mounted to the wiper of a slide potentiometer. The slide potentiometer is then mounted to a "bridge"—a U-shaped aluminum part that provides form and structural integrity for the electronics of the device. A force-sensing resistor (FSR) may then be mounted to the bottom of wiper whereby it sits between the wiper and the edge of the bridge.

The bridge may then be mounted atop a PCB that houses the circuitry for electronics. Between the bridge and PCB exists a FFC (flat flexible cable) that moves in tandem with the wiper of the slide potentiometer. As a result, said FFC also moves in tandem with the encoder, switch, FSR, and LED. All outputs and inputs for the device may thus be located on the PCB.

The present invention also solves a design problem of current mixers and controllers: providing for unrestricted linear motion of the encoder, switch, FSR, and LED while keeping intact all necessary electronic connections. This problem is solved through the FFC design of the current invention as well as possible variations thereof whereby the FFC could be replaced with a mutli-conductive sliding surface. Such a design would eliminate the need for a cable and also result in increased structural integrity and reduced size.

Although a variety of examples and other information have been used to explain aspects of the present invention, no limitation of the claims should be implied based on particular features or arrangements in such examples as one of ordinary skill would be able to use these examples to derive a wide variety of implementations. Further, and although some subject matter may have been described in language specific to examples of structural features, it is to be understood that the subject matter defined in the appended claims is not necessarily limited to these described features. Such functionality can be distributed differently in components other than those identified herein. Rather, the described features are disclosed as examples of components within the scope of the appended claims.

What is claimed is:

1. A music hardware controller, the controller comprising: a mixer console that controls audio signals originating from one or more musical input devices; a plurality of multi-operational controllers located within a housing of the mixer console, wherein each of the multi-operational controllers includes a combination rotary encoding and force sensing slide potentiometer allowing for simultaneous adjustment, each of the plurality of multi-operational controllers corresponding to at least one signal from the audio signals controlled by the mixer console; and a plurality of visually perceptible red-green-blue (RGB) light-emitting diodes (LED) corresponding to each of the multi-operational controllers and providing feedback related to control of the audio signals by the mixer console.

2. The music hardware controller of claim 1, wherein the mixer console is modular and allows for introduction or removal of the plurality of multi-operational controllers at will and responsive to demands of a current recording task or venue.

3. The music hardware controller of claim 2, wherein the modular configuration of the mixer console includes at least four (4) multi-operational controllers that push, rotate, and slide.

4. The music hardware controller of claim 1, wherein each of the audio signals corresponds to a channel.

5. The music hardware controller of claim 1, wherein the one or more musical input devices include an artist microphone utilized by a performing artist.

6. The music hardware controller of claim 1, wherein the one or more musical input devices include an acoustical microphone utilized with a musical instrument.

7. The music hardware controller of claim 1, wherein the one or more musical input devices include an electronic instrument.

8. The music hardware controller of claim 1, wherein the one or more musical input devices include music hardware providing a sample.

9. The music hardware controller of claim 1, wherein the audio signals correspond to volume, timbre, or dynamics.

10. The music hardware controller of claim 1, wherein the mixer console controls the audio signals by routing the audio signals to additional music hardware.

11. The music hardware controller of claim 1, wherein the mixer console controls the audio signals by summing the signals to produce a combined output signal.

12. The music hardware controller of claim 11, wherein the combined output signal is broadcast, amplified, or recorded.

13. The music hardware controller of claim 1, wherein the mixer console controls the audio signals by mixing the audio signals.

14. The music hardware controller of claim 1, wherein the plurality of multi-operational controllers further include force-sensitive resistance componentry that are related to control of the audio signals by the mixer console.

15. The music hardware controller of claim 1, wherein the plurality of visually perceptible RGB LEDs for each of the plurality of multi-operational controllers is mounted to a wiper of the slide potentiometer for each of the plurality of multi-operational controllers.

16. The music hardware controller of claim 15, wherein each slide potentiometer is mounted to a bridge.

17. The music hardware controller of claim 16, wherein a force-sensing resistor (FSR) is mounted to the bottom of the wiper for each of the multi-operational controllers, the FSR providing force-sensing functionality and sitting between the wiper and an edge of the bridge.

18. The music hardware controller of claim 17, wherein the bridge for each of the multi-operational controllers is mounted on top of a PCB that houses electronics circuitry.

19. The music hardware controller of claim 18, wherein a flat flexible cable (FFC) is located between the bridge and the PCB and moves in tandem with the wiper of the slide potentiometer, thereby allowing for all inputs and outputs to be located on the PCB.

* * * * *